United States Patent
Moia

(10) Patent No.: US 11,364,968 B2
(45) Date of Patent: Jun. 21, 2022

(54) PRESSURE MODULATOR FOR AN ANTI-LOCK BRAKING SYSTEM OF A BICYCLE

(71) Applicant: Robert Bosch GmbH, Stuttgart (DE)

(72) Inventor: Alessandro Moia, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 17/014,501

(22) Filed: Sep. 8, 2020

(65) Prior Publication Data

US 2021/0086865 A1 Mar. 25, 2021

(30) Foreign Application Priority Data

Sep. 19, 2019 (DE) .......................... 202019105187.6

(51) Int. Cl.
| | |
|---|---|
| *B62L 3/00* | (2006.01) |
| *B60T 8/32* | (2006.01) |
| *B60T 8/42* | (2006.01) |

(52) U.S. Cl.
CPC .............. *B62L 3/00* (2013.01); *B60T 8/3225* (2013.01); *B60T 8/4266* (2013.01)

(58) Field of Classification Search
CPC ......... B62L 3/00; B60T 8/3225; B60T 8/4266
See application file for complete search history.

(56) References Cited

U.S. PATENT DOCUMENTS

| | | | | |
|---|---|---|---|---|
| 5,102,207 A | * | 4/1992 | Leppek | ............... B60T 8/17616 303/115.2 |
| 2005/0067892 A9 | * | 3/2005 | Heubner | ............... B60T 8/3225 303/113.5 |
| 2018/0009424 A1 | * | 1/2018 | Lauhoff | .................... B60T 8/42 |

FOREIGN PATENT DOCUMENTS

| | | | | |
|---|---|---|---|---|
| DE | 3526189 A1 | * | 2/1987 | ............. B60T 8/447 |
| DE | 4015746 A1 | * | 11/1991 | ............ B60T 8/4863 |
| DE | 322422 C2 | * | 8/1993 | |
| DE | 102012222058 A1 | | 6/2014 | |
| DE | 102017100279 A1 | * | 7/2018 | ................ B60T 8/32 |
| EP | 3366536 A1 | | 8/2018 | |
| JP | H05201319 A | * | 8/1993 | |
| KR | 20110124602 A | * | 11/2011 | |
| KR | 20180026921 A | * | 3/2018 | |
| TW | I649232 B | | 2/2019 | |

* cited by examiner

*Primary Examiner* — Melanie Torres Williams
(74) *Attorney, Agent, or Firm* — Norton Rose Fulbright US LLP; Gerard Messina

(57) ABSTRACT

A pressure modulator for an anti-lock braking system of a bicycle. The pressure modulator includes a cylinder, and a piston having a through opening for hydraulic fluid, the piston being situated inside the cylinder and subdividing the cylinder into a first accumulator chamber and a second accumulator chamber, the first and second accumulator chambers being connectable to each other via the through opening. The pressure modulator further includes a valve system, which includes a closing element and an actuating device for the closing element, the closing element being situated in the through opening, and the actuating device being situated at a bottom of the cylinder, and an actuator for moving the piston.

12 Claims, 5 Drawing Sheets

PRESSURE MODULATOR FOR AN ANTI-LOCK BRAKING SYSTEM OF A BICYCLE

CROSS REFERENCE

The present application claims the benefit under 35 U.S.C. § 119 of German Patent Application No. DE 202019105187.6 filed on Sep. 19, 2019, which is expressly incorporated herein by reference in its entirety.

FIELD

The present invention relates to a pressure modulator for an anti-lock braking system of a bicycle as well as to an anti-lock braking system equipped with such a pressure modulator; in addition, it relates to an electrically operable two-wheeler, in particular a bicycle such as a Pedelec or S-Pedelec having such an anti-lock braking system.

BACKGROUND INFORMATION

In the more recent past, more powerful brakes with brake disks have been used not only in electrically operable bicycles but also in normal bicycles. This brings with it the risk that a user of such a bicycle or such an electrically operable bicycle brakes too strongly and that a front wheel, in particular, will lock in the process and cause a rollover, a fall or the like. A solution for such dangerous driving situations is able to be achieved by anti-lock braking systems. Since a weight of the vehicle, among other things, is a reason for purchasing bicycles and electrically operable bicycles, such anti-lock braking systems must have the lowest possible weight. A reduced number of components is also advantageous in order to provide an optically pleasing bicycle. European Patent No. 33 66 536 A1 describes, for example, a pressure modulator for an anti-lock braking system which has an integrated brake booster. Although this makes it possible to reduce a required braking force of the driver, the design of the pressure modulator becomes very complicated. In this particular case, the design is additionally selected so that a spring is provided against which an actor must operate in order to supply brake fluid from the brake caliper. The system is such that a driver is not able to increase a brake pressure in the brake caliper beyond an initial preloading of the spring. If a malfunction of the spring occurs, then the normal brake will no longer function and a driver will no longer be able to decelerate the bicycle.

SUMMARY

In accordance with an example embodiment of the present invention, a pressure modulator of an anti-lock braking system of a bicycle or an electrically operable bicycle according to the present invention may have the advantage that the driver is able to perform a safe braking operation in any operating situation. The example pressure modulator according to the present invention has a very simple and compact design. This results in a reduced weight and a space-saving design so that the pressure modulator does not adversely affect an optical impression of the bicycle. In the present invention, this may be achieved in that the pressure modulator has a cylinder and a piston, the piston being provided with a through opening in the piston and being able to be acted upon from two sides. In addition, a valve system is provided, which includes a closing element and an actuating device for the closing element. The closing element is situated in the through opening in the piston, and the actuating device is disposed at a bottom of the cylinder and set up to actuate the closing element. Moreover, an actuator for moving the piston is provided so that an anti-lock control is possible via the actuator. The piston disposed in the cylinder subdivides the cylinder into a first, in particular upper, and a second, in particular lower, accumulator chamber, the first and the second accumulator chambers being connectable to each other by way of the through opening. As a result, the valve system is integrated into the piston and the cylinder so that the pressure modulator requires very little space.

Preferred further developments of the present invention are described herein.

The through opening preferably has a first sealing seat directed toward the upper accumulator chamber, and a second sealing seat directed toward the lower accumulator chamber. This achieves a particularly simple design of the pressure modulator.

In a further preferred manner, the closing element is loosely situated in the through opening in a manner that allows it to move. The closing element is preferably a ball.

In order to provide a particularly simple, cost-effective design of the pressure modulator, the valve system is developed without springs. In other words, the valve system is provided not as a spring-loaded non-return valve as is commonly the case in the related art, but manages without a spring. This is possible because the valve system with a closing element and actuating device is subdivided and integrated into the piston and the cylinder.

According to an alternative preferred embodiment of the present invention, the pressure modulator includes a restoring element situated between the piston and the cylinder. The restoring element returns the piston to a starting position in which the valve system is open. The starting position is a state in which a user of the bicycle does not brake. A spring force of the restoring element may be very low.

The actuating device on the cylinder is preferably a pin at the bottom of the cylinder. The pin is situated, preferably via arms, on a connection of a line that connects the cylinder to the brake on the wheel of the bicycle.

In order to allow for a particularly economical design, the actuator is preferably a solenoid actuator. The solenoid actuator is preferably integrated into a jacket of the cylinder and can thereby be positioned in a very space-saving manner. As an alternative, the actuator is an electric motor connected to the piston.

A sealing ring is preferably provided on the piston to provide sealing between the two accumulator chambers in the cylinder.

In a furthermore preferred manner, the pressure modulator includes a pressure-limiting device, which is preferably situated on a line of the pressure modulator.

According to a further preferred embodiment of the present invention, the piston has a conical development on a side directed toward the first accumulator chamber. This allows for an optimal configuration of an effective piston area that is directed toward the first accumulator chamber. The effective piston area determines the hydraulic force able to be generated by the piston.

In addition, the present invention relates to an anti-lock braking system of a two-wheeler, in particular a bicycle or an electrically operable bicycle, which includes a pressure modulator according to the present invention. It should be noted that an electrically operable bicycle is understood as a bicycle which is able to be operated using muscle power and/or in an electrical manner, in particular a Pedelec or an S-Pedelec.

Moreover, the present invention relates to a two-wheeler, in particular a bicycle or an electrically operable bicycle which has an anti-lock braking system including a pressure modulator according to the present invention. The two-wheeler preferably has an anti-lock braking system on a front wheel and/or a rear wheel.

BRIEF DESCRIPTION OF THE DRAWINGS

Below, preferred exemplary embodiments of the present invention are described in detail with reference to the figures.

DETAILED DESCRIPTION OF EXAMPLE EMBODIMENTS

Below, an electrically operable bicycle 1 having a pressure modulator according to a first exemplary embodiment of the present invention will be described in detail.

Figure 1:
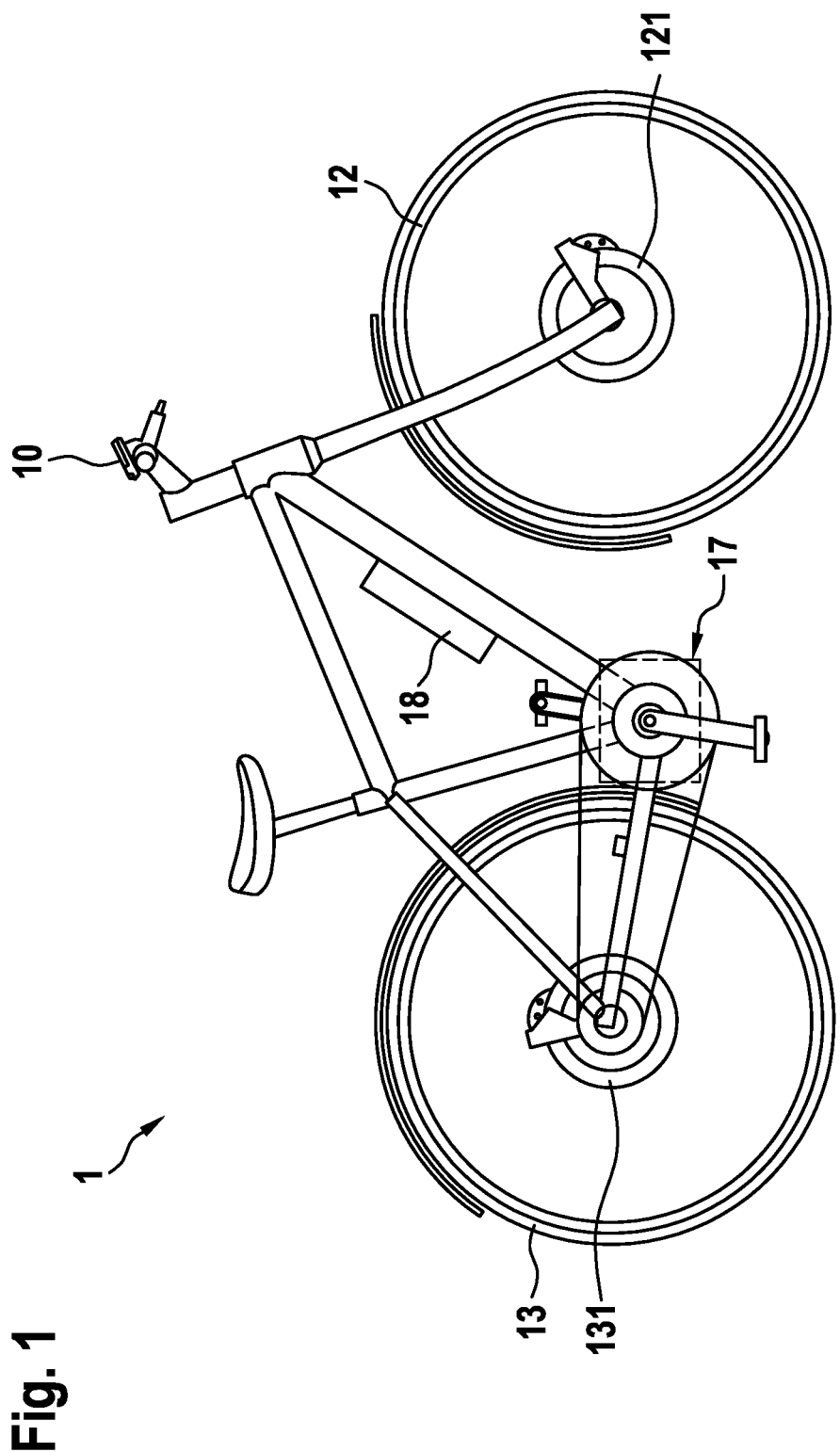
FIG. 1 shows a schematic view of an electrically operable bicycle having an anti-lock braking system and a pressure modulator according to a first exemplary embodiment of the present invention.

Electrically operable bicycle 1 is shown in FIG. 1 and has a front wheel 12 equipped with a front wheel brake 121 and a rear wheel 13 equipped with a rear wheel brake 131.

Figure 2:
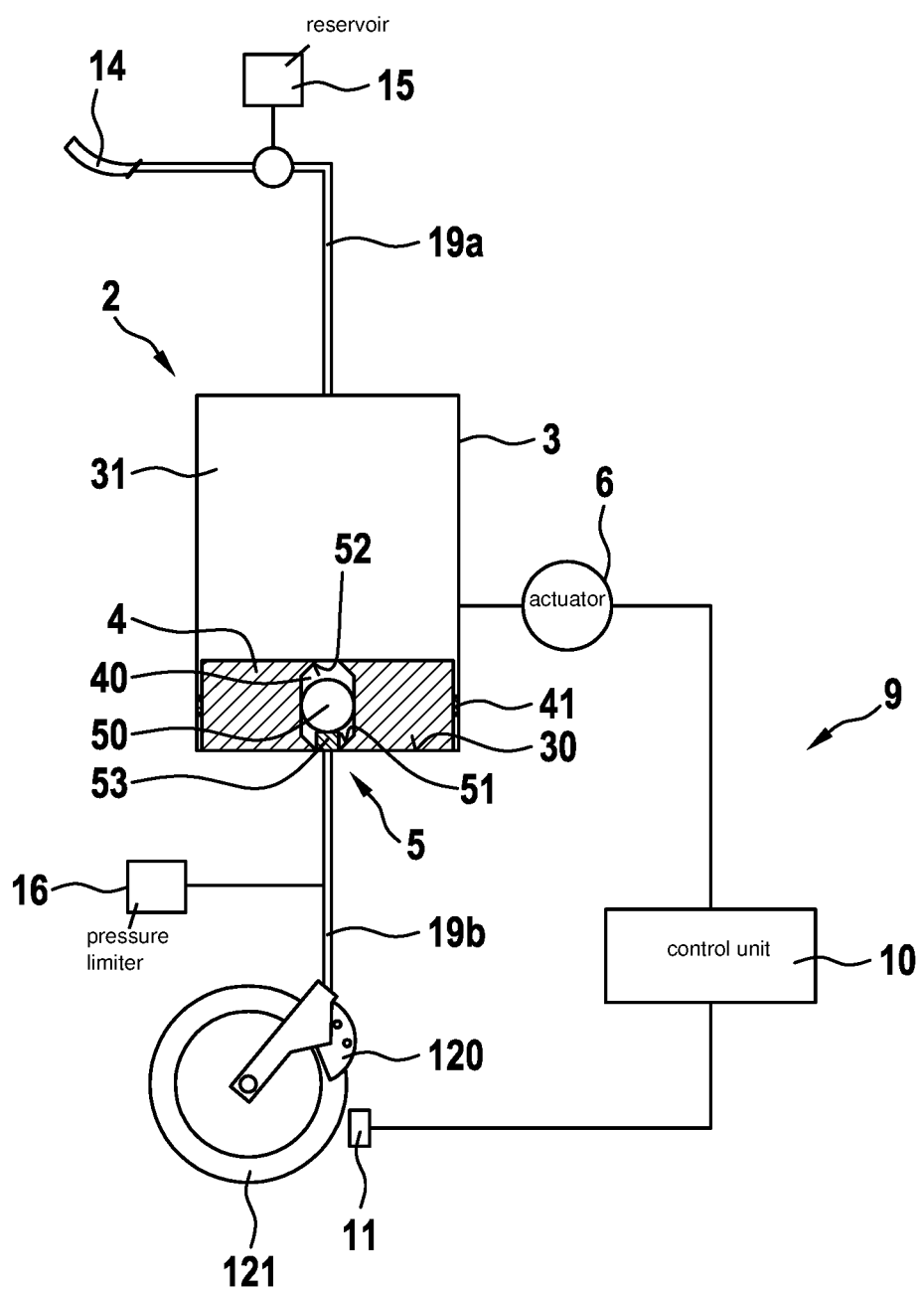
FIG. 2 shows a schematic illustration of the pressure modulator of FIG. 1 during a normal braking operation.
Figure 3:
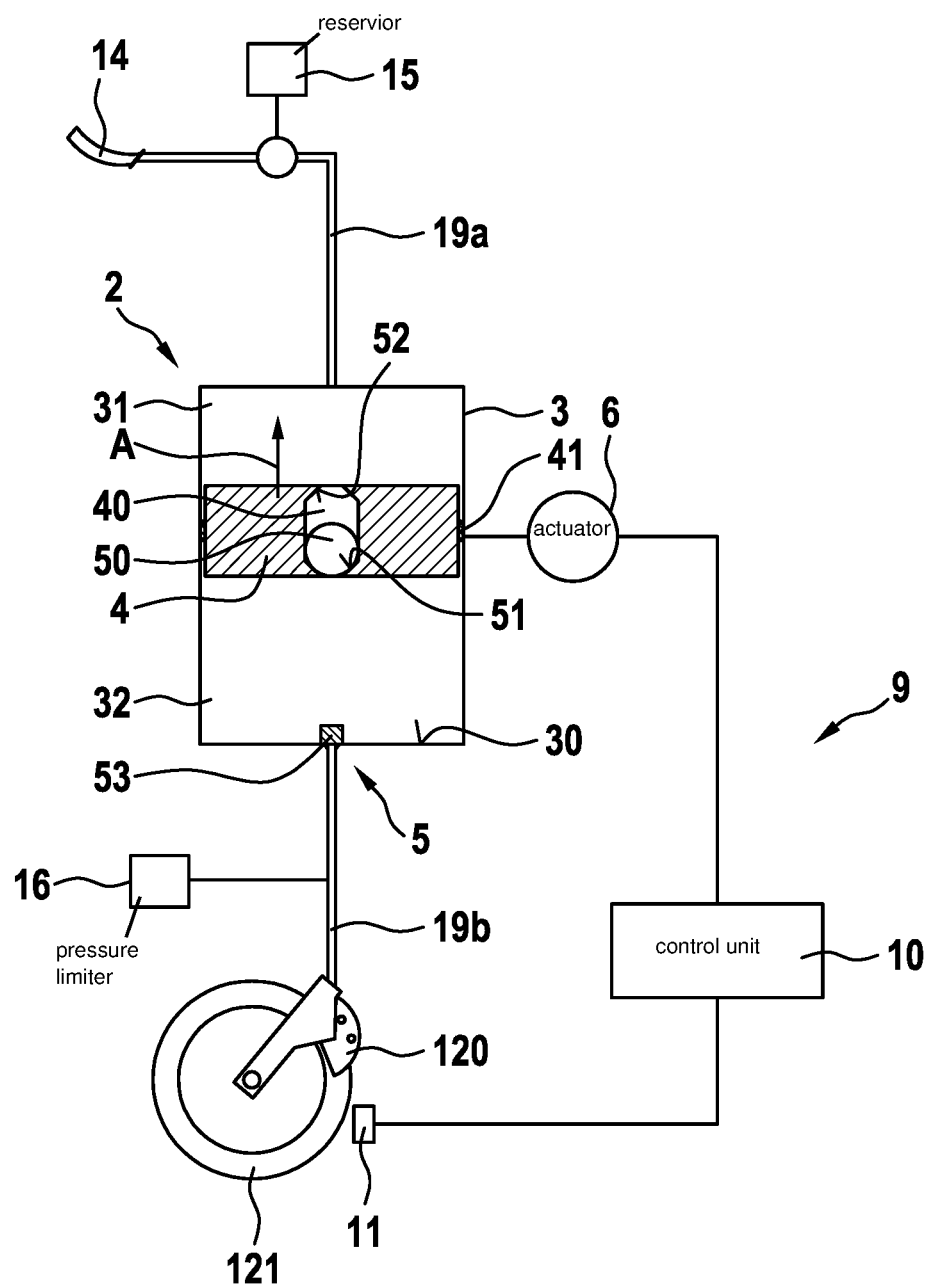
FIG. 3 shows a schematic illustration of the pressure modulator of FIG. 2 during an ABS control intervention.

In this exemplary embodiment, both brakes have an integrated anti-lock braking system 9, which is illustrated in detail in FIGS. 2 and 3. Electrically operable bicycle 1 furthermore has an electrical drive 17, which is provided in a mid-engine layout, as well as an accumulator 18, which supplies electrical drive 17 with electrical energy.

FIGS. 2 and 3 schematically illustrate a pressure modulator 2, which is described for a front wheel brake 121 by way of example. However, the pressure modulator may be developed in the same way also for the rear wheel brake.

As is able to be gathered from FIG. 2, pressure modulator 2 includes a cylinder 3 and a cylindrical piston 4 which is movably situated inside cylinder 3. Piston 4 has a through opening 40 by way of which a fluid is able to be conducted. A seal 41 is provided at the outer circumference of piston 4. This subdivides the cylinder into a first or upper accumulator chamber 31 and a second or lower accumulator chamber 32.

In addition, the pressure modulator includes a valve system 5. Valve system 5 has a closing element 50, which is a ball in this exemplary embodiment, as well as an actuating device 53. Actuating device 53 is disposed at the bottom 30 of cylinder 3. Actuating device 53 is a pin. As a result, the valve system is partially integrated into the piston and partially into the cylinder.

Moreover, a first sealing seat 51 and a second sealing seat 52 are provided in through opening 40. Closing element 50 could seal either at first sealing seat 51 or at second sealing seat 52, or else it is in an intermediate position in which closing element 50 does not seal through opening 40 at any of the two sealing seats 51, 52, and fluid is able to pass through through opening 40.

This intermediate position is achieved especially in the position illustrated in FIG. 2, in which closing element 50 is in contact with actuating device 53 so that both the first and second sealing seat 51, 52 are open.

Pressure modulator 2 furthermore includes an actuator 6, which is a solenoid actuator in this exemplary embodiment. The solenoid actuator is capable of moving piston 4 back and forth inside cylinder 3.

A first hydraulics line 19a leads from a brake lever 14 on the bicycle to cylinder 3. A second hydraulics line 19b then leads from cylinder 3 to a brake caliper 120 at front wheel brake 121.

Reference numeral 15 denotes a reservoir for a hydraulic fluid, which is used in the pressure modulator of the anti-lock braking system.

In addition, a control unit 10 is provided, which is connected to actuator 6. As is illustrated further in FIG. 2, control unit 10 is also connected to a sensor 11 at front wheel brake 121. Sensor 11, for example, detects locking of a wheel of the bicycle in order to then initiate an ABS control. Sensor 11 is a wheel speed sensor, for instance. Sensor 11 need not necessarily be placed on front wheel brake 121 but can also be placed in some other location on the front wheel.

As may furthermore be gathered from FIG. 2, a pressure limiter 16 is provided on second hydraulics line 19b. Pressure limiter 16 is used for restricting a maximum pressure that is conveyed to front wheel brake 121.

FIG. 2 shows the normal braking state of the bicycle in which a driver has pulled on a brake lever 14 so that a pressure rise comes about in first hydraulics line 19a and in first accumulator chamber 31 of cylinder 3. The piston is then pushed to the end position on bottom 30 of the cylinder shown in FIG. 2. In the process, closing element 50 is lifted off first sealing seat 51 by pin-type actuating device 53 so that hydraulic fluid is able to enter second hydraulics line 19b via through opening 40 and past open sealing seats 51, 52, from where it then reaches front wheel brake 121. A normal braking operation is performed in this way.

If the brake pressure then becomes too high and the front wheel locks, the ABS control sets in with the aid of control unit 10. Sensor 11 transmits the locking of the wheel to control unit 10. In response, control unit 10 activates actuator 6, which moves piston 4 in the direction of first hydraulics line 19a (arrow A). This position is illustrated in FIG. 3. This causes second accumulator chamber 32 to enlarge and the through opening at first sealing seat 51 to be closed, so that a pressure at front wheel brake 121 is reduced. The locking of the wheel is thereby canceled and a rollover prevented, in particular. As illustrated in FIG. 3, closing element 50 at first sealing seat 51 closes because of the movement of piston 4 inside cylinder 3.

This movement by cylinder 3 is able to be brought about by a simple energization of actuator 6, which is embodied as a solenoid actuator. As soon as the locking of the wheel is canceled, the energization of actuator 6 is interrupted so that the brake pressure, in the event that the driver is still pulling on brake lever 14, is guided back to first accumulator chamber 31 again. Piston 4 thereby moves back in the direction of bottom 30 until piston 4 is resting against bottom 30 and second accumulator chamber 32 has completely disappeared again. In this position, which is shown in FIG. 2, actuating device 53 pulls closing element 50 off first sealing seat 51 again.

Therefore, a pressure modulator 2 for an anti-lock braking system 9 is able to be provided which is developed without springs. Pressure modulator 2 has a very simple and economical design. Moreover, only a minimum of space is required for the components of the pressure modulator and anti-lock braking system 9.

According to the present invention, an anti-lock functionality is able to be realized simply by a control of an actuator 6. A spring or some other critical component in the pressure modulator is not required in this exemplary embodiment. No spring or the like, which could cause problems in the functioning of the basic brake of the bicycle, is provide in this exemplary embodiment. In addition, there is no component-side restriction of a maximum pressure, which a driver is able to build up at brake caliper 120. A pressure restriction is solely determined by pressure limiter 16.

Pressure limiter 16 is able to ensure that the brake functions without any problems even if the driver applies very high forces via brake lever 14.

Since piston 4 is surrounded by the hydraulic fluid in first accumulator chamber 31, an effective piston area determines a hydraulic force able to be generated by the piston. Especially when using a solenoid actuator, this is advantageous insofar as a geometrical form of the side of piston 4 facing first accumulator chamber 31 is freely selectable, for instance in order to optimize magnetic forces. This makes it possible to release the brake especially rapidly after a locking event by the control of actuator 6.

Figure 4:
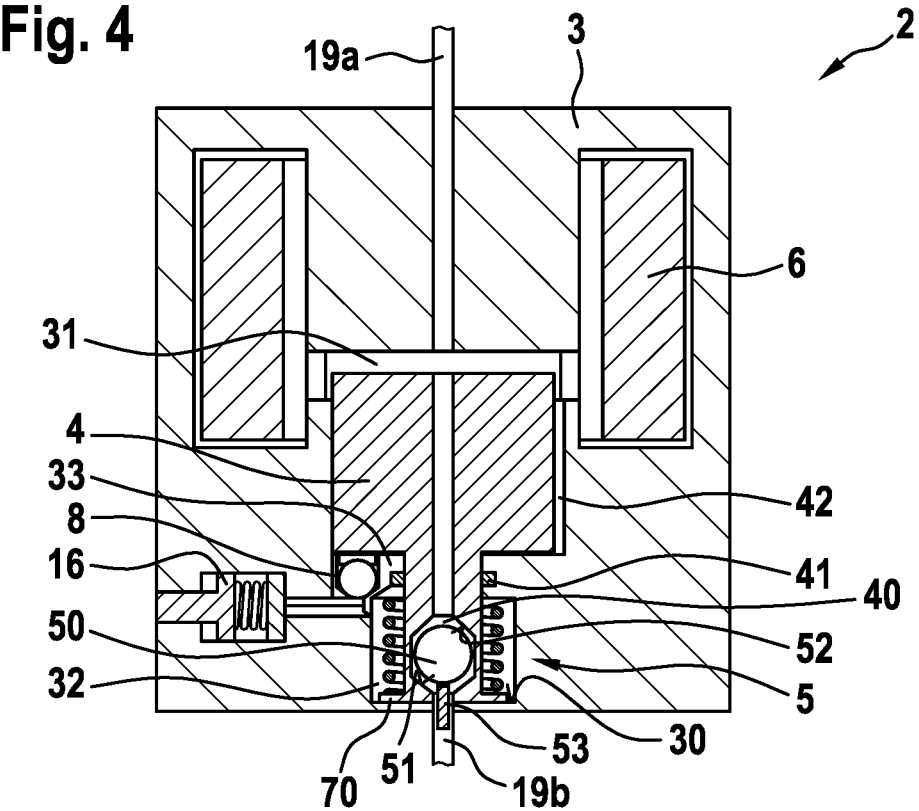
FIG. 4 shows a schematic sectional view of a pressure modulator according to a second exemplary embodiment of the present invention.

FIG. 4 shows a schematic side view of a pressure modulator 2 according to a second exemplary embodiment of the present invention. Identical or functionally equivalent parts have been provided with the same reference numerals.

As may be gathered from FIG. 4, pressure modulator 2 has a piston 4 that has a different geometrical design. Piston 4 once again is provided with a through opening 40 and a valve system 5 partially disposed inside piston 4, similar to the first exemplary embodiment. However, piston 4 of the second exemplary embodiment is a stepped piston. In accordance with the step in the piston, cylinder 3 is also developed with a correspondingly adapted step. In addition, pressure modulator 2 of the second exemplary embodiment has a restoring element 7. Restoring element 7 is situated between cylinder 3 and piston 4 and returns piston 4 to the starting position shown in FIG. 4.

Closing element 50 of valve system 5 is open in this starting position because actuating device 53, which is developed as a pin, lifts closing element 50 off first sealing seat 51. A fluid connection thus exists between the first and second hydraulics line 19a and 19b, respectively.

Restoring element 7 is situated in second accumulator chamber 32. In this exemplary embodiment, restoring element 7 is a cylinder spring. One end of restoring element 7 is supported on a ring step 70 of the piston and the other end is supported on cylinder 3 on an inwardly directed ring projection 33. Moreover, a check valve 8 is additionally situated between upper accumulator chamber 31 and lower accumulator chamber 32. In piston 4 itself, a slot 42 is moreover provided on a piston jacket side in order to allow for a simple and reliable movement of the piston.

As in the first exemplary embodiment, the area of piston 4 directed toward first accumulator chamber 31 has a planar design. Spring element 7 in the second exemplary embodiment therefore ensures that the brake is always open and ready to brake in an operating position in which no braking operation is initiated by the driver.

Figure 5:
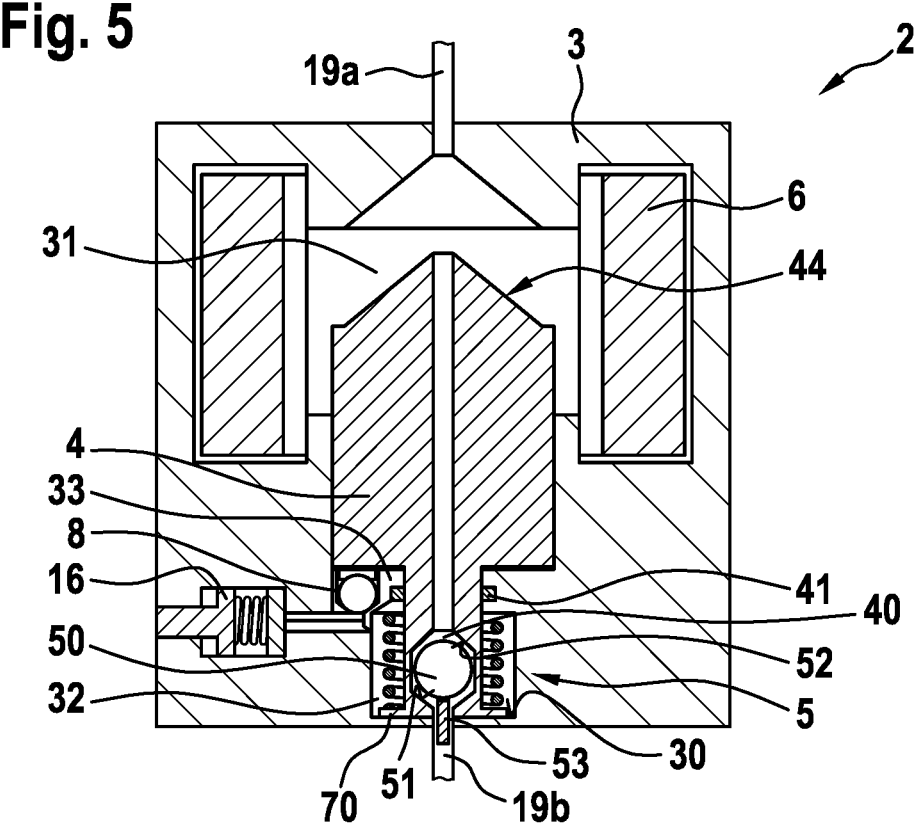
FIGS. 5 through 7 show alternative developments of pressure modulators according to the present invention, in particular featuring different geometrical piston shapes.
Figure 6:
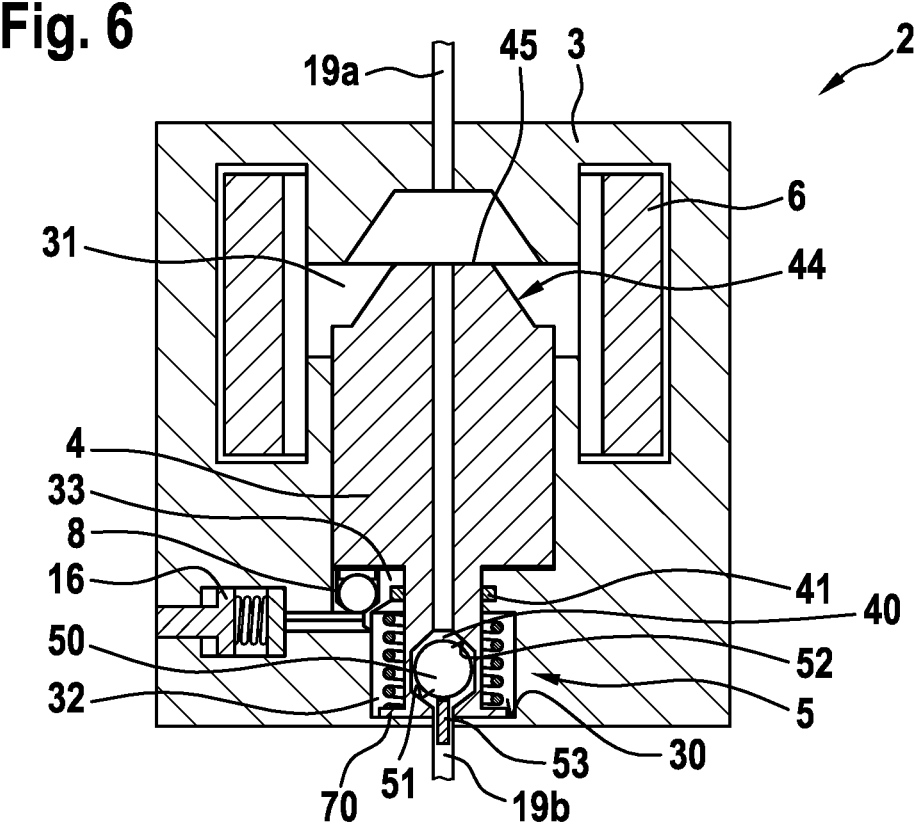
Figure 7:
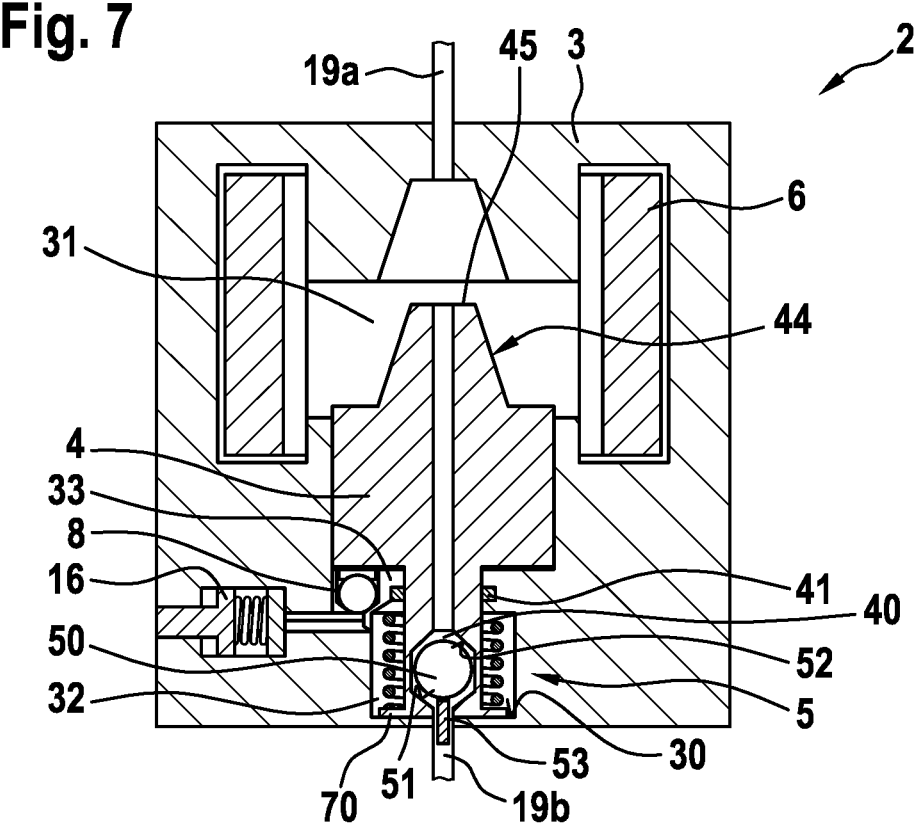

FIGS. 5 through 7 show alternative embodiments of piston 4 of a pressure modulator according to the present invention. In FIG. 5, the piston has a region 44 that tapers from a piston center. The piston thus is situated in cylinder 3 in the axial direction in such a way that a greater overlap with a coil of solenoid actuator 6 is provided (see FIG. 5).

FIG. 6 shows a geometry of piston 4 in which an end region 45 of the piston directed toward upper accumulator chamber 31 has a flat design next to tapering region 44.

FIG. 7 shows a pressure modulator having a piston 4, which in essence has a similar form as the piston shown in FIG. 6, but a gradient of the tapering region is greater than in the piston of FIG. 6.

The exemplary embodiments of piston 4 shown in FIGS. 5 through 7 make it clear that piston 4 is able to be optimized in relation to the solenoid armature, in particular with regard to its geometrical form. A spring force of restoring element 7 is able to be selected to be very small because only the resetting of piston 4 in cylinder 3 is required in the non-braked state of the brake of the bicycle.

What is claimed is:

1. A pressure modulator for an anti-lock braking system of a bicycle, comprising:
    a cylinder;
    a piston having a through opening for hydraulic fluid, the piston being situated inside the cylinder and subdividing the cylinder into a first accumulator chamber and a second accumulator chamber, the first accumulator chamber and the second accumulator chambers being connectable to each other via the through opening;
    a valve system which includes a closing element and an actuating device for the closing element, the closing element being situated in the through opening, and the actuating device being situated at a bottom of the cylinder; and
    an actuator configured to move the piston,
    wherein the through opening has a first sealing seat directed toward the second accumulator chamber and a second sealing seat directed toward the first accumulator chamber.

2. The pressure modulator as recited in claim 1, wherein the closing element is loosely situated in the through opening in a manner that allows the closing element to move.

3. The pressure modulator as recited in claim 1, wherein the closing element is a ball.

4. The pressure modulator as recited in claim 1, wherein the actuator is a solenoid actuator, or the actuator is an electric motor connected to the piston.

5. The pressure modulator as recited in claim 1, wherein the piston has a conical or flat development on a side directed toward the first accumulator chamber.

6. A pressure modulator for an anti-lock braking system of a bicycle, comprising:
    a cylinder;
    a piston having a through opening for hydraulic fluid, the piston being situated inside the cylinder and subdividing the cylinder into a first accumulator chamber and a second accumulator chamber, the first accumulator chamber and the second accumulator chambers being connectable to each other via the through opening;
    a valve system which includes a closing element and an actuating device for the closing element, the closing element being situated in the through opening, and the actuating device being situated at a bottom of the cylinder; and
    an actuator configured to move the piston,
    wherein the valve system is developed without springs.

7. A pressure modulator for an anti-lock braking system of a bicycle, comprising:

a cylinder;
a piston having a through opening for hydraulic fluid, the piston being situated inside the cylinder and subdividing the cylinder into a first accumulator chamber and a second accumulator chamber, the first accumulator chamber and the second accumulator chambers being connectable to each other via the through opening;
a valve system which includes a closing element and an actuating device for the closing element, the closing element being situated in the through opening, and the actuating device being situated at a bottom of the cylinder;
an actuator configured to move the piston; and
a restoring element situated between the piston and the cylinder, which returns the piston to a starting position in which the valve system is open.

8. A pressure modulator for an anti-lock braking system of a bicycle, comprising:
a cylinder;
a piston having a through opening for hydraulic fluid, the piston being situated inside the cylinder and subdividing the cylinder into a first accumulator chamber and a second accumulator chamber, the first accumulator chamber and the second accumulator chambers being connectable to each other via the through opening;
a valve system which includes a closing element and an actuating device for the closing element, the closing element being situated in the through opening, and the actuating device being situated at a bottom of the cylinder; and
an actuator configured to move the piston,
wherein the actuating device is a pin at the bottom of the cylinder.

9. A pressure modulator for an anti-lock braking system of a bicycle, comprising:
a cylinder;
a piston having a through opening for hydraulic fluid, the piston being situated inside the cylinder and subdividing the cylinder into a first accumulator chamber and a second accumulator chamber, the first accumulator chamber and the second accumulator chambers being connectable to each other via the through opening;
a valve system which includes a closing element and an actuating device for the closing element, the closing element being situated in the through opening, and the actuating device being situated at a bottom of the cylinder;
an actuator configured to move the piston; and
a pressure-limiting device which limits a brake pressure maximally able to be applied by a rider of the bicycle.

10. An anti-lock braking system of a bicycle, comprising:
a pressure modulator, including:
a cylinder;
a piston having a through opening for hydraulic fluid, the piston being situated inside the cylinder and subdividing the cylinder into a first accumulator chamber and a second accumulator chamber, the first accumulator chamber and the second accumulator chambers being connectable to each other via the through opening;
a valve system which includes a closing element and an actuating device for the closing element, the closing element being situated in the through opening, and the actuating device being situated at a bottom of the cylinder; and
an actuator configured to move the piston,
wherein at least one of:
the through opening has a first sealing seat directed toward the second accumulator chamber and a second sealing seat directed toward the first accumulator chamber,
a restoring element is situated between the piston and the cylinder, which returns the piston to a starting position in which the valve system is open,
the actuating device is a pin at the bottom of the cylinder, or
a pressure-limiting device limits a brake pressure maximally able to be applied by a rider of the bicycle.

11. A two-wheeler, the two-wheeler being a bicycle, the two-wheeler comprising:
an anti-lock braking system including a pressure modulator, the pressure modulator including:
a cylinder;
a piston having a through opening for hydraulic fluid, the piston being situated inside the cylinder and subdividing the cylinder into a first accumulator chamber and a second accumulator chamber, the first accumulator chamber and the second accumulator chambers being connectable to each other via the through opening;
a valve system which includes a closing element and an actuating device for the closing element, the closing element being situated in the through opening, and the actuating device being situated at a bottom of the cylinder; and
an actuator configured to move the piston,
wherein at least one of:
the valve system is developed without springs,
a restoring element is situated between the piston and the cylinder, which returns the piston to a starting position in which the valve system is open,
the actuating device is a pin at the bottom of the cylinder, or
a pressure-limiting device limits a brake pressure maximally able to be applied by a rider of the bicycle.

12. The two-wheeler as recited in claim 11, wherein a front wheel of the two-wheeler and/or a rear wheel of the two-wheeler is/are equipped with the anti-lock braking system.

* * * * *